US 8,320,460 B2

(12) United States Patent
Yan

(10) Patent No.: US 8,320,460 B2
(45) Date of Patent: Nov. 27, 2012

(54) DYADIC SPATIAL RE-SAMPLING FILTERS FOR INTER-LAYER TEXTURE PREDICTIONS IN SCALABLE IMAGE PROCESSING

(75) Inventor: Yong Yan, Austin, TX (US)

(73) Assignee: Freescale, Semiconductor, Inc., Austin, TX (US)

( * ) Notice: Subject to any disclaimer, the term of this patent is extended or adjusted under 35 U.S.C. 154(b) by 1622 days.

(21) Appl. No.: 11/532,701

(22) Filed: Sep. 18, 2006

(65) Prior Publication Data

US 2008/0069239 A1 Mar. 20, 2008

(51) Int. Cl.
 *H04N 7/12* (2006.01)
(52) U.S. Cl. ......... 375/240.21; 375/240.01; 375/240.26; 375/240.29
(58) Field of Classification Search .............. 375/240.21, 375/240.29, 240.01, 240.26
See application file for complete search history.

(56) References Cited

U.S. PATENT DOCUMENTS 6,370,500 B1 * 4/2002 Huang et al. .................. 704/208

OTHER PUBLICATIONS

Trac D Tran, Lijie Liu and Pankaj Topiwala; High-Performance Low-Complexity Re-sampling Filters for SVC; Joint Video Team (JVT) of ISO/IEC MPEG & ITU-T VCEG; 20th Meeting: Klagenfurt, Austria, Jul. 15-21, 2006; pp. 1-8.
Shijun Sun; Texture Upsampling with 4-tap Cubic-Spline Filter; joint video team (JVT) of ISO/IEC MPEG & ITU-T VCEG; 20th Meeting: Klagenfurt, Austria, Jul. 15-21, 2006; pp. 1-8.

* cited by examiner

*Primary Examiner* — Sath V Perungavoor
*Assistant Examiner* — Geepy Pe
(74) *Attorney, Agent, or Firm* — Gary Stanford

(57) ABSTRACT

A dyadic spatial down sampling filter having tap values configured according to a Kaiser window function a beta factor of approximately 2.5, having approximately 1.5 side lobes, and having a down sampling ratio of approximately 1.9. The dyadic spatial down sampling filter may have tap values [−1, 17, 32, 17, −1]/64. A dyadic spatial up sampling filter having tap values configured according to a Kaiser window function having a beta factor of approximately 1.5, having approximately 2 side lobes, and having an up sampling ratio of approximately 2. The dyadic spatial up sampling filter may have tap values [−5.44, 0, 20.71, 33.46, 20.71, 0, −5.44]/64.0, or tap values [−5, 0, 21, 32, 21, 0, −5]/64, or tap values [−5, 21, 21, −5]/32.

16 Claims, 4 Drawing Sheets

DYADIC SPATIAL RE-SAMPLING FILTERS FOR INTER-LAYER TEXTURE PREDICTIONS IN SCALABLE IMAGE PROCESSING

BACKGROUND OF THE INVENTION

1. Field of the Invention

The present invention relates in general to scalable image processing, and more specifically to dyadic spatial re-sampling filters for inter-layer texture predictions in scalable video coding.

2. Description of the Related Art

The Advanced Video Coding (AVC) standard, Part 10 of MPEG4 (Motion Picture Experts Group), otherwise known as H.264, includes advanced compression techniques that were developed to enable transmission of video signals at a wide range of bit rates or to enable improved video quality at a given transmission rate. The newer H.264 standard outperforms video compression techniques of prior standards in order to support higher quality video at given bit rates and to enable internet-based video and wireless applications and the like. The standard defines the syntax of the encoded video bit stream along with a method of decoding the bit stream. Scalable Video Coding (SVC) is an extension of the H.264 which addresses coding schemes for reliably delivery of video to diverse clients over heterogeneous networks using available system resources, particularly in scenarios where the downstream client capabilities, system resources, and network conditions are not known in advance, or dynamically changing from time to time.

SVC achieves scalability by using base and enhanced layers concept, where an enhanced layer, or upper layer, is scalable from a lower layer, e.g., a base layer. Whereas H.264 has relatively limited scalability, SVC provides multiple levels of scalability including temporal scalability, spatial scalability, complexity scalability and quality scalability. The base layer should be the simplest form in quality, spatial resolution and temporal resolution. Temporal scalability generally refers to the number of frames per second (fps) of the video stream, such as 7.5 fps, 15 fps, 30 fps, etc. Spatial scalability refers to the resolution of each frame, such as common interface format (CIF) with 352 by 288 pixels per frame, or quarter CIF (QCIF) with 176 by 144 pixels per frame, although other spatial resolutions are contemplated, such as 4CIF, QVGA, VGA, SVGA, D1, HDTV, etc. Up and down sampling, or more generally, re-sampling, of an image signal is a common function performed in image communication systems, including video systems, to facilitate scaling between different spatial resolutions. Dyadic spatial scalability refers to spatial scalability by a factor of two in both horizontal and vertical directions, which is a factor of two for each image or frame. Extended Spatial Scalability (ESS) includes dyadic and non-dyadic spatial re-sampling. Several disadvantages occur when the dyadic case is included in ESS. A first disadvantage is the relatively complex phase calculations associated with ESS. Another disadvantage is the additional low pass filtering for the interpolation of sub-pixels.

It is desired to provide to improve dyadic re-sampling filters for balancing the tradeoff between visual quality, power and memory consumption for image processing.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed. Although the present disclosure is illustrated using video processing embodiments for processing video information, such as MPEG (Motion Picture Experts Group) type video information, the present disclosure applies in general to the processing of any image information or sequential image information, such as JPEG (Joint Photographic Experts Group) information, motion JPEG (MJPEG) information, JPEG2000 information, motion JPEG2000 (MJPEG2000) information, etc. The term "image information" as used herein is intended to apply to any video or image or image sequence information.

Figure 1:
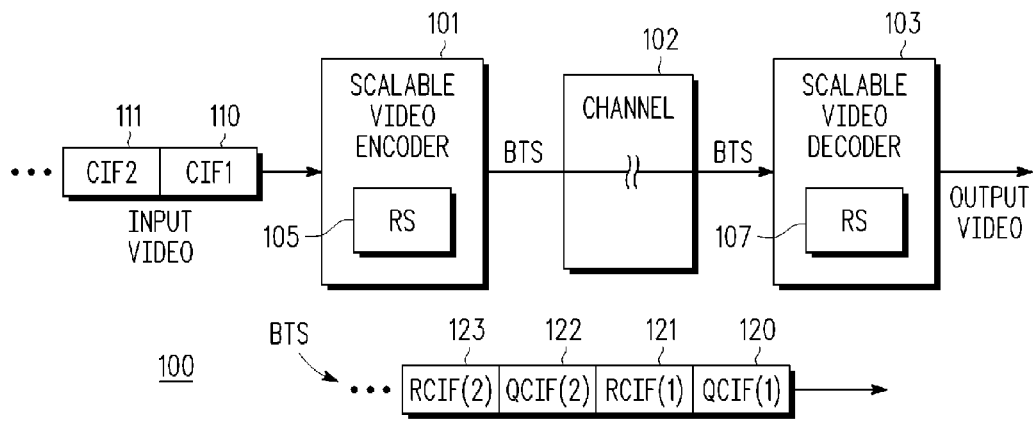
FIG. 1 is a simplified block diagram of a scalable video system implemented according to an exemplary embodiment of the present invention illustrating spatial scalability.

FIG. 1 is a simplified block diagram of a scalable video system 100 implemented according to an exemplary embodiment of the present invention illustrating spatial scalability. The video system 100 may incorporate other scalabilities, such as temporal scalability, complexity scalability, quality scalability, etc. The scalable video system 100 includes a scalable video encoder 101 and a scalable video decoder 103. The video encoder 101 encodes input video and encapsulates the encoded video information into a bitstream (BTS). The BTS is provided via channel 102 to the video decoder 103, which provides output video. The channel 102 may be any media or medium, and wireless communications are contemplated. In the configuration illustrated, the scalable video system 100 is a two layer system in which the input video is provided at a common interface format (CIF) spatial layer and in which the BTS incorporates both CIF and quarter CIF (QCIF) video information. The input video is provided as blocks of CIF information, shown from right to left as CIF1 block 110, CIF2 block 111, etc. As shown, the BTS includes, from right to left, a first encoded QCIF block, QCIF(1) block 120, followed by an encoded residual CIF block, RCIF(1) block 121, which is followed by a second encoded QCIF block, QCIF(2) block 122, followed by a second residual CIF block, RCIF(2) block 123, and so on. In this manner, the video decoder 103 receives sufficient information for decoding the BTS and providing output video with spatial layers at QCIF or CIF. Although the scalable video system 100 illustrates only two layers, embodiments according to the present invention are not limited to any particular number of scalable layers or input resolutions.

As known to those skilled in the art, each video frame is subdivided into one or more slices and encoded at the macroblock (MB) level, where each MB is a 16×16 block of pixels. The size of each slice is arbitrary and may range between a single MB up to all of the MBs in the frame. The relative size of each block encoded within in the BTS may also range from a single MB up to an entire frame. As described further below, the video encoder 101 incorporates re-sampling (RS) filter 105 for facilitating up and down sampling during the encoding process and the video decoder 103 incorporates another RS filter 107 for facilitating up sampling during the decoding process. Down sampling is not used in the video decoder 103 since the QCIF information may be decoded directly whereas the CIF layer is achieved by up sampling the QCIF information and adding to decoded residual CIF information as described further below. Although the video encoder and decoder 101, 103 may be configured for ESS, the RS filters 105 and 107 are used for dyadic spatial re-sampling, such as conversion between QCIF and CIF. A two layer system is illustrated for purposes of clarity of explanation, where it is understood that embodiments according to the present invention apply to any multiple level system including two or more spatial levels. The BTS typically includes encoded information for the selected base layer and residual information for higher layers.

Figure 2:
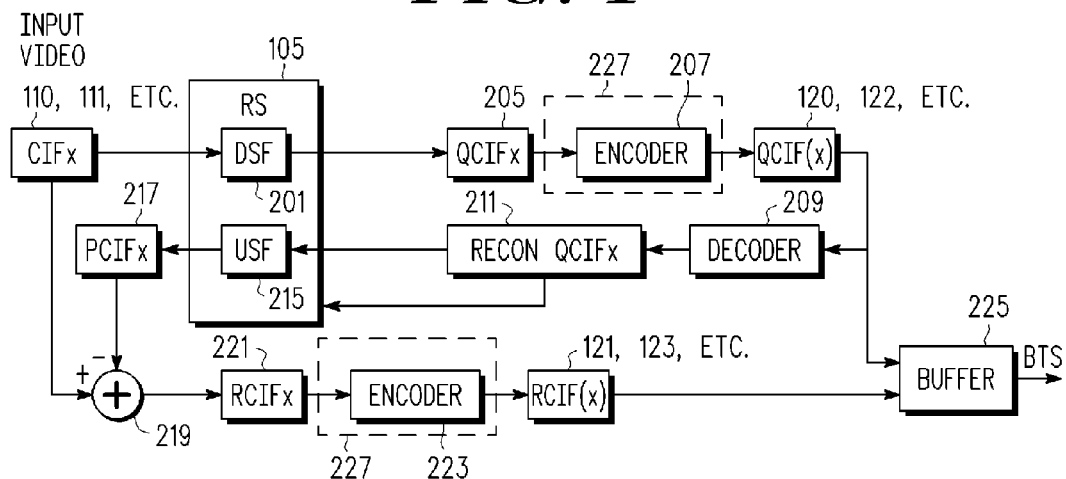
FIG. 2 is a figurative block diagram illustrating the up and down sampling process performed by the video encoder of FIG. 1.

FIG. 2 is a figurative block diagram illustrating the up and down sampling process performed by the video encoder 101 for dyadic spatial re-sampling. The CIFx blocks from the video input (in which "x" denotes the block number of the input video including CIF1 block 110, CIF2 block 111, etc.) are provided to a down sampling filter (DSF) 201 within the RS 105, which outputs corresponding QCIFx blocks 205. The QCIFx blocks 205 are each encoded by the video encoder 101, represented as an encoder 207, which outputs encoded QCIF blocks QCIF(x), which includes QCIF(1) block 120, QCIF(2) block 122, etc. The encoded QCIF(x) blocks are provided to one input of an output buffer 225, which incorporates or otherwise encapsulates the encoded QCIF(x) blocks within the bitstream BTS. The encoded QCIF(x) blocks are decoded within the video encoder 101, represented as a decoder 209, which outputs reconstructed QCIF blocks shown as RECON QCIFx blocks 211. The RECON QCIFx blocks 211 are each provided to the input of an up sampling filter (USF) 215 within the RS 105. The output of the LPF 215 provides predictive PCIFx blocks 217, which are each combined with corresponding ones of the CIFx blocks by an adder 219 to provide residual RCIFx blocks 221. In particular, the adder 219 subtracts PCIF1 from CIF1 to provide RCIF1, subtracts PCIF2 from CIF2 to provide RCIF2, etc. The residual RCIFx blocks 221 are encoded, represented as encoder 223, which outputs encoded residual blocks RCIF (x), which includes RCIF(1) block 121, RCIF(2) block 123, etc. The output buffer 225 incorporates or otherwise encapsulates the encoded reference RCIF(x) blocks 121 into the bitsream BTS. It is noted that the encoders 207 and 223 may be implemented as a single encoder 227 as understood by those skilled in the art.

Figure 3:
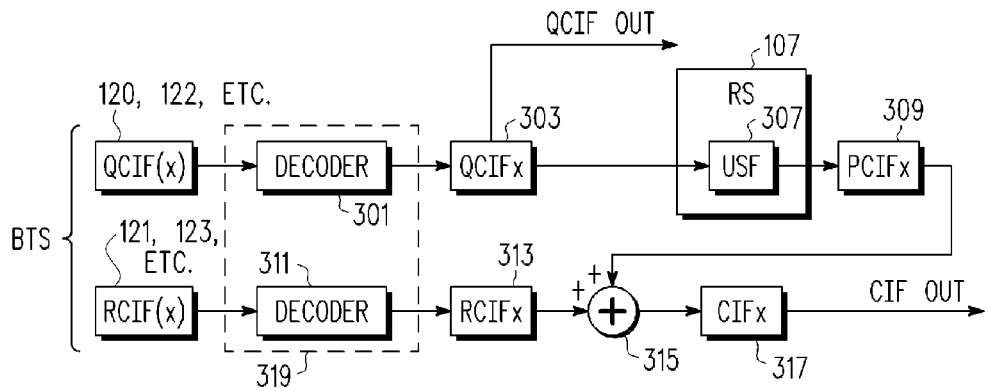
FIG. 3 is a simplified figurative block diagram illustrating the up sampling process performed by the video decoder of FIG. 1.

FIG. 3 is a simplified figurative block diagram illustrating the up sampling process performed by the video decoder 103 for dyadic spatial re-sampling. The QCIFx blocks (120, 122, etc.) are extracted from the bitstream BTS and provided to a decoder 301, which outputs corresponding decoded QCIFx blocks 303 as part of a QCIF video output for storage or display. The decoded QCIFx blocks 303 are provided to the input of an up sampling filter 307 within the RS 107. The output of the up sampling filter 307 provides prediction PCIFx blocks 309, which are provided to one input of an adder 315. The residual RCIF(x) blocks (e.g., 121, 123, etc.) are provided within the video decoder 103 to a decoder 311, which outputs corresponding residual RCIFx blocks 313 provided to the other input of the adder 315. The adder 315 adds each of the predictive PCIFx blocks 309 with a corresponding one of the residual RCIFx blocks 313 and outputs corresponding CIFx video blocks 317 for storage or display. It is noted that the decoders 301 and 311 may be implemented as a single decoder 319 as understood by those skilled in the art.

The RS filters 105 and 107 may include other filters (not shown) that are selected during non-dyadic spatial re-sampling. The filters 201 and 215 are selected for the video encoder 101 during dyadic spatial sampling and the filter 307 is selected for the video decoder 103 during dyadic spatial sampling. A signal or flag or the like may be used to distinguish between the different applications to determine when to apply dyadic re-sampling. In one embodiment, the USF 215 of the video encoder 101 operates in substantially identical manner as the USF 307 of the video decoder 103 to avoid mismatch or variations of video between the encoder and decoder.

Figure 4:
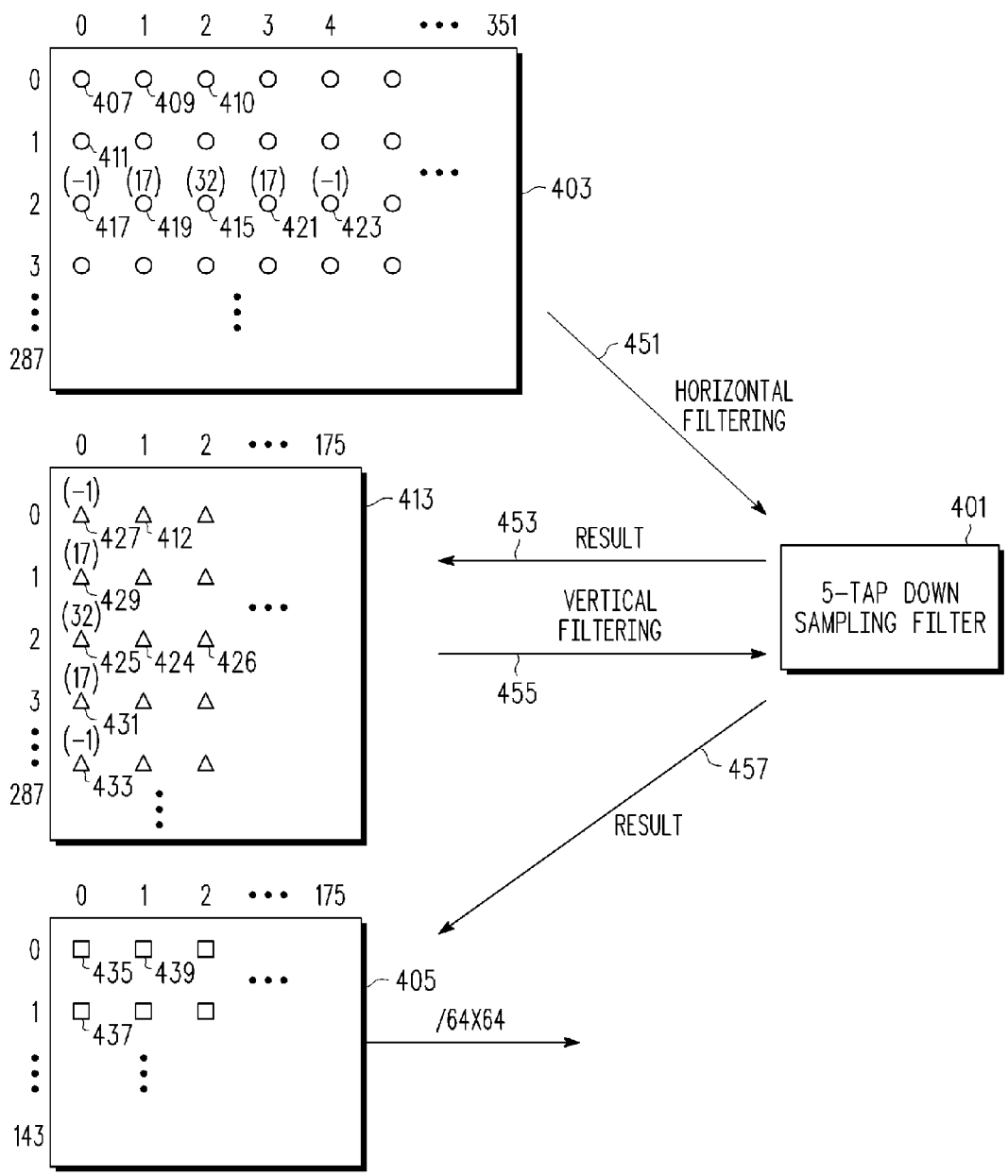
FIG. 4 is graphic representation of down sampling using a 5-tap down sampling filter implemented according to an exemplary embodiment of the present invention which may be used as the down sampling filter of FIG. 2.

FIG. 4 is graphic representation of down sampling using a 5-tap down sampling filter 401 implemented according to an exemplary embodiment of the present invention which may be used as the down sampling filter 201. The 5-tap down sampling filter 401 is used to spatially down sample a CIF frame 403 including 352×288 pixels to a QCIF frame 405 including 176×144 pixels. Each pixel of the higher resolution CIF frame 403 is shown as a circle including an upper-left pixel 407 located at position [0,0] of the CIF frame 403. Each pixel of the lower resolution QCIF frame 405 is shown as a square. A pixel 409 immediately to the right of the pixel 407 in the horizontal direction of the CIF frame 403 is located at position [0,1] and another pixel 411 immediately below the pixel 407 in the vertical direction is located at position [1,0]. In this manner, the pixels 407 and 409 are located in an "even-numbered" row of pixels and the pixel 411 is located in an "odd-numbered" row of pixels. Also, the pixels 407 and 411 are located in an even-numbered column of pixels whereas the pixel 409 is located in an odd-numbered column of pixels within the CIF frame 403. An intermediate frame 413 illustrates intermediate filtering results between the input CIF frame 403 and the output QCIF frame 405.

It is noted that one or more buffers may be used to store the pixel values of each of the frames during the filtering process. In one embodiment, for example, a first buffer is used to store the input frame (e.g., CIF frame 403), a second buffer is used to store intermediate results (e.g., intermediate frame 413), and the first buffer is used again to hold the output frame (e.g., QCIF frame 405). In another embodiment, three separate buffers are used to store the input, intermediate and output frames, respectively. The one or more buffers are implemented using any appropriate type of memory device.

The 5-tap down sampling filter 401 is applied horizontally to the pixels in the even-numbered columns for every row of the CIF frame 403 to generate pixel values for temporary storage into an intermediate frame 413. Each pixel value in the intermediate frame 413 is shown as a triangle. The 5-tap down sampling filter 401 has the following form:

$$[-1, 17, 32, 17, -1]/64$$

and is applied according to the following equation (1):

$$pvi = \Sigma p_i f_i \qquad (1)$$

in which "p" denotes pixel values in the CIF frame 403, "f" denotes filter values in the 5-tap down sampling filter 401, and "pvi" denotes corresponding pixel values in the intermediate frame 413. The numbers in the brackets are tap values or coefficients as known to those skilled in the art, the forward slash "/" is a divide symbol and the number following the forward slash is a scaling factor for normalization. The 5-tap down sampling filter 401 is applied to the first pixel 407 of the CIF frame 403 to generate a first pixel value 427 in the intermediate frame 413. The pixel 409 is skipped since filtering is only applied to the even-numbered columns of the CIF frame 403. The 5-tap down sampling filter 401 is then applied to a pixel 410 located at position [0,2] in the CIF frame 403 to generate a pixel value 412 in the intermediate frame 413. Operation continues in this manner for the top row of pixels in the CIF frame 403. Then operation proceeds to the second row and the pixel 411 is filtered to generate a pixel 429 in the intermediate frame 413, and so on.

As an illustration, the 5-tap down sampling filter 401 is shown applied to a pixel 415 located at position [2,2] of the CIF frame 403. The five filter values that are applied to corresponding pixels 417, 419, 415, 421 and 423, respectively, of row 2 in the CIF frame 403, are shown in parenthesis above the respective pixels. The first filter value "−1" is multiplied by the value of the pixel 417 located at position [2,0] for a first value, the second filter value "17" is multiplied by the value of the pixel 419 located at position [2,1] for a second value, the third filter value "32" is multiplied by the value of the pixel 415 for a third value, the fourth filter value "17" is multiplied by the value of the pixel 421 located at position [2,3] for a fourth value, and the fifth and last filter value "−1" is multiplied by the value of the pixel 423 located at position [2,4] for a fifth value. The five values are summed together to provide one corresponding pixel value 424 in the intermediate frame 413. Since the pixels in the odd-numbered columns are skipped (decimation), the next pixel value in the current (e.g., second) row of the intermediate frame 413 is determined by applying the 5-tap down sampling filter 401 in substantially identical manner to the pixel 423 in the CIF frame 403 to generate a pixel value 426 in the intermediate frame 413. Filtering operation continues in this manner to generate 176×288 pixel values in the intermediate frame 413.

The number of columns of the intermediate frame 413 have been decimated (via down sampling operation) to half whereas the number of rows is not changed. The 5-tap down sampling filter 401 is then applied vertically to the pixels in the even-numbered rows (i.e., every other row) for every column of the intermediate frame 413 to generate the 176× 144 pixels of the QCIF frame 405. A first pixel 435 in the QCIF frame 405 is generated by applying the 5-tap down sampling filter 401 in the vertical direction to a first pixel value 427 in the intermediate frame 413. Since the odd-numbered rows are skipped during the vertical filtering process, the next pixel value 429 in the intermediate frame 413 is skipped and the filtering process is applied to a next pixel value 425 to generate the value of the next pixel 437 in the QCIF frame 405 in the vertical direction. Operation continues in this manner for the first column of the intermediate frame 413 and then back to the top pixel value 412 in the second row, which is filtered to generate a pixel 439 at position [0,1] in the QCIF frame 405.

As an illustration for generating the value of the pixel 437 in the QCIF frame 405, the 5-tap down sampling filter 401 is shown centered at the pixel value 425 located at position [2,0] of the intermediate frame 413. The five filter values, which are applied to corresponding pixels 427, 429, 425, 431 and 433, respectively, of column 0 in the intermediate frame 413, are shown in parenthesis above the respective pixel values. The filter values are multiplied by the corresponding pixel values in the intermediate frame 413, the resulting values are added together in accordance with equation (1), and the summed value stored as the pixel value 437 in the QCIF frame 405. Operation continues in the same manner for every other row and for every column of pixel values of the intermediate frame 413 to generate the values of the pixels in the QCIF frame 405. An arrow 451 from the CIF frame 403 to the 5-tap down sampling filter 401 represents the initial horizontal filtering and an arrow 453 illustrates the results being stored into the intermediate frame 413. An arrow 455 from the intermediate frame 413 to the 5-tap down sampling filter 401 illustrates the vertical filtering and an arrow 457 from the 5-tap down sampling filter 401 to the QCIF frame 405 illustrates the results being provided to generate the QCIF frame 405.

The values of the pixels in the output QCIF frame 405 are then divided by 64 in both the horizontal and vertical directions, shown as "/64×64" in FIG. 4, to provide a 1:1 correspondence between the values of the pixels of the QCIF frame 405 with the values of the pixels of the CIF frame 403. In other words, the scaling factors applied to the pixels of the input frame during horizontal and vertical filtering are effectively reversed to provide the appropriate normalized values for the output frame.

It is noted that many variations may exist for the particular filtering process. For example, the filtering of the CIF frame 403 to generate the intermediate frame 413 may be performed vertically first followed by horizontal filtering of the intermediate frame 413 to generate the QCIF frame 405. And the scaling factors may be applied to each pixel when being stored into the QCIF frame 405 rather than being applied afterwards. In general, any particular ordering of the filtering functions is contemplated as long as the end results are the same.

Figure 5:
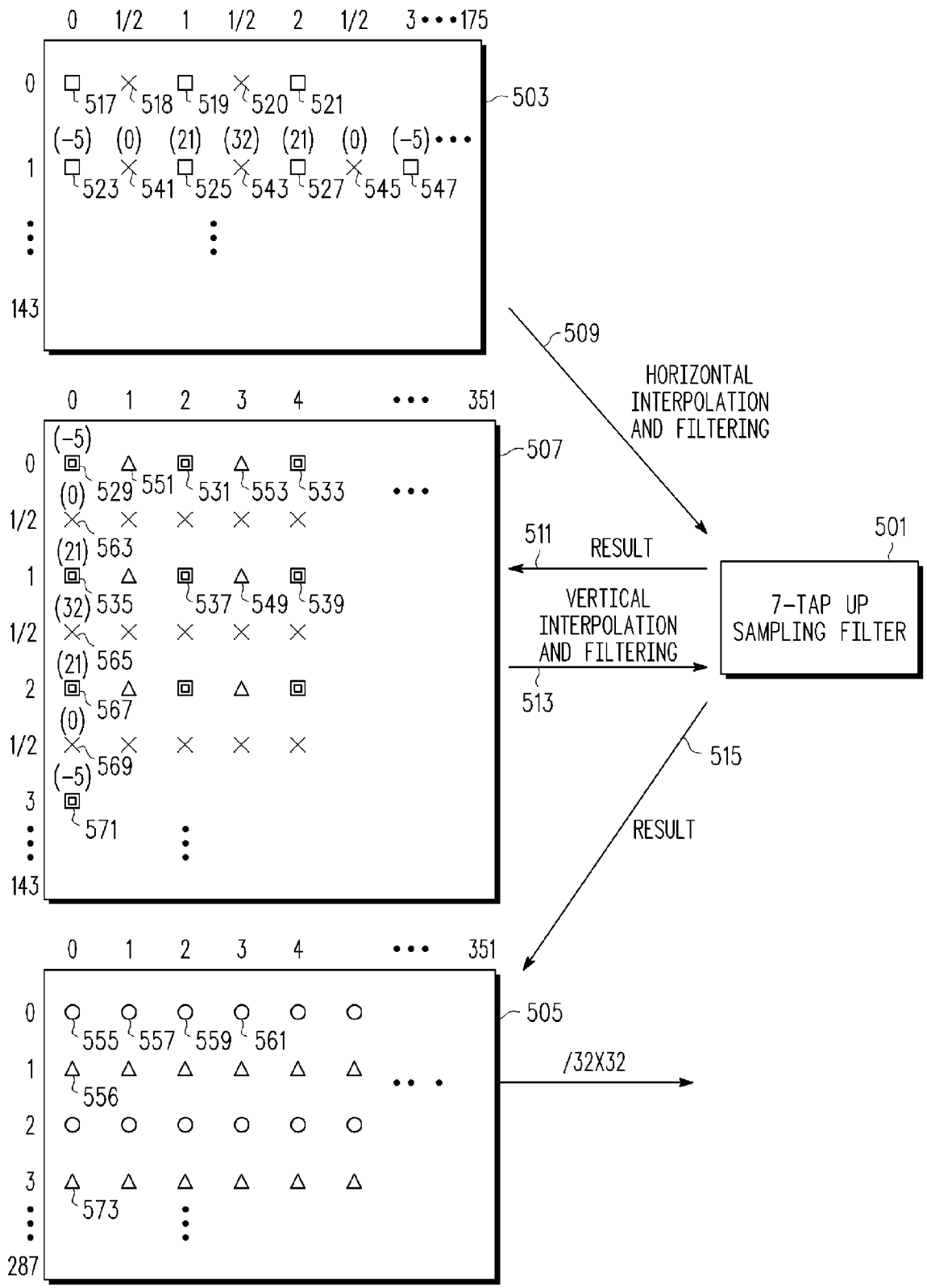
FIG. 5 is graphic representation of up sampling filtering using a 7-tap up sampling filter implemented according to an exemplary embodiment of the present invention which may be used as either or both of the up sampling filters of FIGS. 2 and 3.

FIG. 5 is graphic representation of up sampling filtering using a 7-tap up sampling filter 501 implemented according to an exemplary embodiment of the present invention which may be used as either or both of the up sampling filters 215 and 307. The 7-tap up sampling filter 501 is used to spatially up sample a lower resolution QCIF frame 503 including 176×144 pixels (shown as squares) to a higher resolution CIF frame 505 including 352×288 pixels shown as circles and triangles. The 7-tap up sampling filter 501 has the following form:

$$[-5, 0, 21, 32, 21, 0, -5]/64$$

An intermediate frame 507 illustrates intermediate filtering results between the input QCIF frame 503 and the output CIF frame 505. It is noted that one or more buffers may be used to store the pixel values of each of the frames during the filtering process. In one embodiment, for example, a first buffer is used to store the input frame (e.g., QCIF frame 503), a second buffer is used to store intermediate results (e.g., intermediate frame 507), and the first buffer is used again to hold the output frame (e.g., CIF frame 505). In another embodiment, three separate buffers are used to store the input, intermediate and output frames, respectively. In yet another embodiment, a single buffer is used in which the pixels of the input QCIF frame are spaced apart in the horizontal and vertical directions to allow inserting zeroes between adjacent pixels in both the horizontal and vertical directions, in which the zeroes are then replaced by the interpolated pixel values during the filtering process. The one or more buffers are implemented using any appropriate type of memory device.

In the up sampling case, an arrow 509 illustrates horizontal interpolation and filtering and an arrow 511 illustrates the results stored into the intermediate frame shown at 507. An arrow 513 illustrates vertical interpolation and filtering and an arrow 515 illustrates the results stored as the CIF frame shown at 505. Each of the filtered pixel values of the CIF frame shown at 505 are then divided by 32 in the horizontal and vertical directions, represented as /32×32 as understood by those skilled in the art. The triangles in the intermediate frame shown at 507 and the CIF frame shown at 505 represent values or placeholders (e.g., zeroes or undefined values), which are inserted between pixels in the buffers and which are then determined according to filtering procedures as further described below. The intermediate frame 507 has the same number of rows as the QCIF frame 503 (e.g., 144) and twice the number of columns (e.g., 176×2=352). The odd-numbered columns (1, 3, 5, etc.) in the intermediate frame 507 are shown as triangles representing an inserted column of values that are initially zeroes (or undefined values) as part of the horizontal interpolation process. In other words, a value (e.g., zero) is inserted between each consecutive pair of pixels in the horizontal direction. The CIF frame 505 has the same number of columns as the intermediate frame 507 and twice the number of rows (e.g., 144×2=288). The odd-numbered rows in the CIF frame 505 are shown as triangles representing an inserted row of values that are initially zeroes (or undefined values) as part of the vertical interpolation process.

The QCIF frame 503 is shown with one-half (½) phase locations between each pair of horizontal pixels and shown with "X" symbols. These are not real values but instead are positions that correspond to the pixel values inserted between the horizontal values in the intermediate frame 507 (shown as triangles). The horizontal filtering is applied to each ½ phase position to derive a corresponding interpolated pixel value in the intermediate frame 507. For example, the 7-tap up sampling filter 501 is applied to (and centered at) the ½ phase position 518 to determine the pixel value 551 in the intermediate frame 507. In a similar manner, the intermediate frame 507 includes ½ phase positions located between each pair of vertical pixels, also shown as "X" symbols. Again, these are not real values but instead are positions that correspond to the pixel values inserted between the vertical values in the CIF frame 505 shown as triangles. The vertical filtering is applied to each ½ phase position in the intermediate frame 507 to derive a corresponding interpolated pixel value in the CIF frame 505. For example, the 7-tap up sampling filter 501 is applied to (and centered at) the ½ phase position 563 of the intermediate frame 507 to determine the pixel value 556 in the CIF frame 505.

In the illustrated configuration, horizontal filtering begins by centering the 7-tap up sampling filter 501 on the first pixel 517 of the QCIF frame 503. The center value of the filter is 32, so that the value of the pixel 517 is multiplied by 32. Since there are no pixels to the left of pixel 517, the left filter values are ignored. The remaining filter values (to the right of center) 21, 0 and −5 are applied to the ½ phase position 518, the next pixel 519 and the next ½ phase position 520. In this manner, the non-zero filter values are applied to the ½ phase positions and the zero filter values are applied to the integer pixel positions, so that remaining calculations are zero. In this manner, the value of the pixel 517 is multiplied by 32 to determine the first pixel value 529 in the intermediate frame 507. The pixel value 529 is represented with a double-square symbol.

The filter values of the 7-tap up sampling filter 501 is then shifted one-half pixel positioning to the right in the horizontal direction and centered on the ½ phase position 518. The filter value 21 to the left of center is applied to pixel 517, so that the value of the pixel 517 is multiplied by 21. Since the center tap is applied to a ½ phase position which has no value or is zero (e.g., corresponding to inserted zero pixel value 551 in the intermediate frame 507), the result is zero. The remaining filter values to the left of center fall outside of the QCIF frame 503 and are ignored. The next filter value 21 to the right of center is applied to pixel 519, so that the value of the pixel 519 is multiplied by 21. The next filter value, which is zero, is applied to the next ½ pixel location 520 resulting in a zero value. The last filter value of −5 is multiplied by the value of the pixel 521. In this manner, the values of the pixels 517, 519 and 521 are multiplied by filter values 21, 21 and −5, respectively, and the result is stored into the inserted pixel 551 of the intermediate frame 507. Operation proceeds in similar manner for all integer and ½ pixel locations.

As an example, consider the ½ phase position 543 between pixels 525 and 527 in row 1 of the QCIF frame 503 used to determine an interpolated value of pixel 549 between the pixel values 537 and 539 in the horizontal direction in the intermediate frame 507. The tap values (or coefficients) of the 7-tap up sampling filter 501 are centered at the ½ phase position 543 as indicated by tap values above the pixels 523, 525, 527, and 547 and alternating ½ phase positions 541, 543 and 545 as illustrated. The center tap value of 32 is applied to a zero or undefined value resulting in a zero value. The tap values applied to the remaining ½ phase positions are all zeroes, so that these values may be ignored. In this manner, the first tap value −5 is multiplied by the value of the pixel 523 for a first value, the third tap value 21 is multiplied by the value of the value of the pixel 525 for a second value, the fifth tap value 21 is multiplied by the value of the value of the pixel 527 for a third value, and the seventh tap value −5 is multiplied by the value of the value of the pixel 547 for a fourth value. The resulting four values are added together to determine the pixel value 549 in the intermediate buffer 507. The 7-tap up sampling filter 501 is applied to each of the ½ phase positions of the QCIF frame 503 in similar manner to determine the value of each of the interpolated values (shown as triangles) in the intermediate frame 507.

The filtering result is the same for each pixel in the QCIF frame 503 at the integer locations, so that each is multiplied by the center tap value 32 of the 7-tap up sampling filter 501 and stored into corresponding positions in the even-numbered columns of the intermediate frame 507, each represented as double-squares. For example, the values of the pixels 517, 519 and 521 of the first row of the QCIF frame 503 are each multiplied by 32 and then stored as pixel values 529, 531, and 533, respectively, in the even-numbered columns of the intermediate frame 507. The rest of the pixels at the integer locations of the first row are completed in the same manner. Likewise, the values of the pixels 523, 525 and 527 of the second row of the QCIF frame buffer 503 are each multiplied by 32 and then stored as pixel values 535, 537, and 539, respectively, in the corresponding even-numbered columns of the intermediate buffer 507, and the remaining pixels of the second row are completed in the same manner. The same is true for all of the integer pixels of the QCIF frame 503, which are multiplied by the filter center value and stored into corresponding positions of the even-numbered columns of the intermediate buffer 507. Each ½ phase position of the QCIF frame 503 is filtered in the same manner as described above, so that all of the triangle pixel values are calculated in similar manner within the intermediate frame 507.

After horizontal interpolation and filtering is completed, vertical interpolation and filtering is performed in substantially similar manner. Operation is similar for the vertical interpolation and filtering to derive the pixels of the CIF frame 505 based on the pixel values of the intermediate frame 507. In this case, the ½ pixel positions are shown represented as "X" symbols inserted between the rows of pixel values of the intermediate frame 507, which correspond to the inserted pixels at the odd-numbered rows in the CIF frame 505 and shown represented with triangles. When the 7-tap up sampling filter 501 is centered at the integer pixel values in the intermediate frame 507, the non-zero filter values are applied to the ½ phase positions and the zero values are applied to integer positions. In this manner, the pixel values of the intermediate frame 507 are each multiplied by the center tap value 32 of the 7-tap up sampling filter 501 and then stored into corresponding positions in the even-numbered rows of the CIF frame 505, shown as circles. For example, the values of the pixel values 529, 551, 553 and 533 of the first row of the intermediate frame 507 are each multiplied by 32 and then stored as pixel values 555, 557, 559 and 561, respectively, in the first row of the CIF frame buffer 505. The same is true for all integer pixel values in the intermediate frame 507 to derive the pixels of the even-numbered rows of the CIF frame 505.

The vertical filtering process applied to the ½ phase positions of the intermediate frame 507 are determined in similar manner as described above for the horizontal filtering process. As an example, a first ½ phase position 563 is shown inserted between pixel values 529 and 535, a second ½ phase position 565 is shown inserted between pixel values 535 and 567, and a third ½ phase position 569 is shown inserted between pixel values 567 and 571 of the intermediate frame 507. When centered on the ½ phase position 565 to determine the value of the pixel 573 in the CIF frame 505, the filter values are centered at the ½ phase position 565 in the vertical direction as shown above the pixel values 529, 535, 567 and 571 and the ½ phase positions 563, 565, and 569 in the first column of the intermediate frame 507. Again, the ½ phase positions are zero and thus do not affect the calculation. The four pixel values 529, 535, 567 and 571 are multiplied by filter values −5, 21, 21, and −5, respectively, and the four values are added together to determine the value of the pixel 573 in the CIF frame 505. Operation proceeds in similar manner for the remaining interpolated pixels in the CIF frame 505. After all of the values of the pixels have been determined in the CIF frame 505, the value of each pixel is divided by 32 in the horizontal direction and then divided by 32 in the vertical direction, represented as /32×32 in FIG. 5.

It is appreciated that the calculations may be performed in any order as long as the results are the same. For example, rather than walking through the horizontal and vertical filtering process alternating between integer and ½ phase positions, the integer pixel calculations may be performed first followed by the ½ phase position calculations in both horizontal and vertical positions. The vertical interpolation and filtering results may be multiplied by $32^2$ (1,024) and before being stored into the CIF frame 505 rather than waiting until after filtering.

Figure 6:
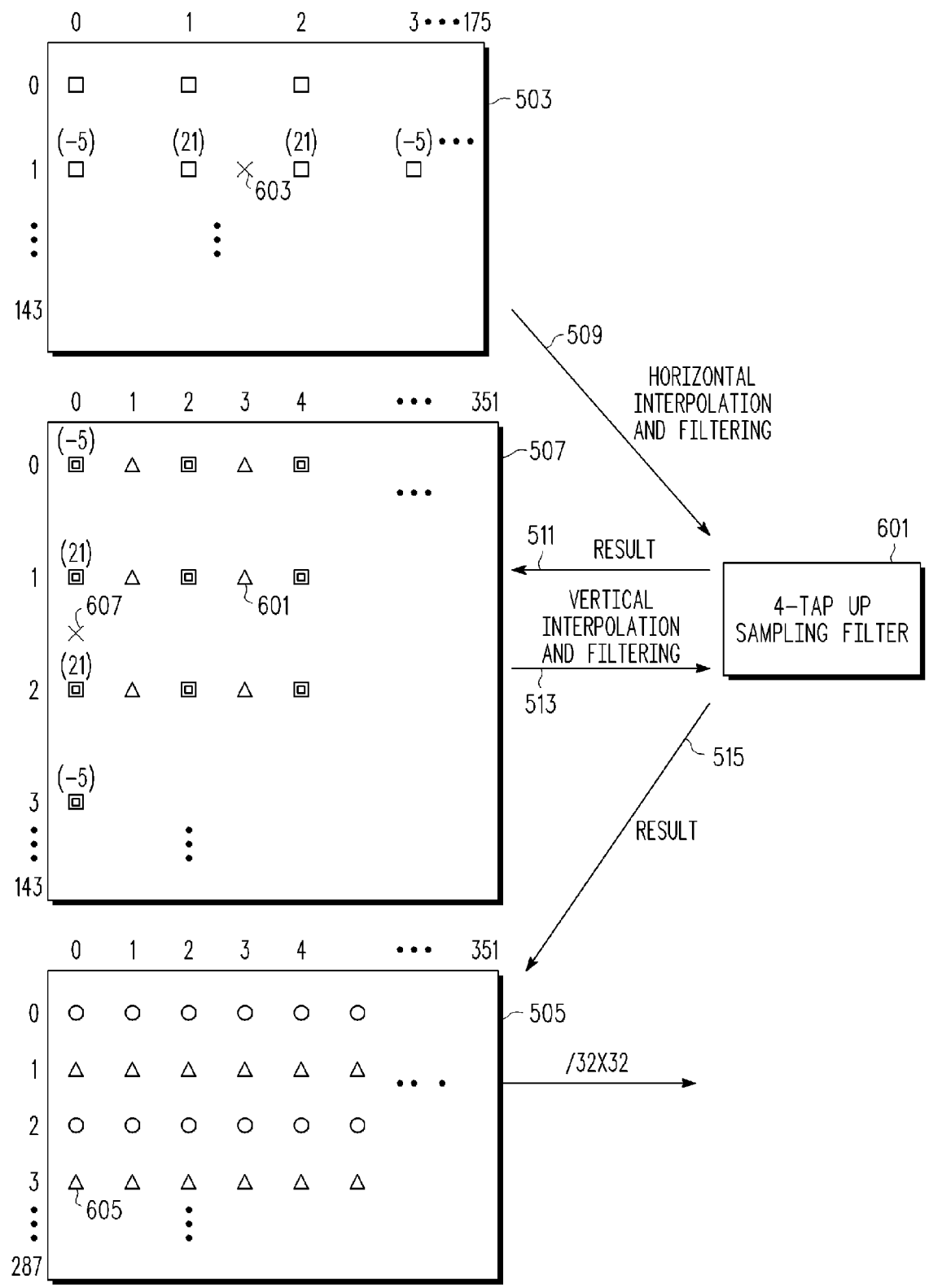
FIG. 6 is graphic representation of up sampling filtering using a 4-tap up sampling filter implemented according to an exemplary embodiment of the present invention which may be used as either or both of the up sampling filters of FIGS. 2 and 3.

FIG. 6 is graphic representation of up sampling filtering using a 4-tap up sampling filter 601 implemented according to an exemplary embodiment of the present invention which may be used as either or both of the up sampling filters 215 and 307. In this case, the 4-tap up sampling filter 601 replaces the 7-tap up sampling filter 501, since the 4-tap filter is the equivalent of the 7-tap filter for interpolating pixels at the half-pixel positions with a scaling factor 32 rather than 64. The 4-tap up sampling filter 601 has the following form:

[−5, 21, 21, −5]/32

Operation is substantially similar. The intermediate frame 507 includes pixel values inserted at the odd-numbered columns between the integer pixels of the QCIF frame 503 in the same manner, and the CIF frame 505 includes pixels inserted at the odd-numbered rows between the integer pixel values of the intermediate frame 507. The ½ pixel positions are not shown, although filtering is applied in similar manner to the ½ pixel positions. Each of the integer pixels of the QCIF frame 503 are multiplied by 32 in substantially the same manner and stored at pixel values in the even-numbered columns shown as double-square symbols. When filtering the ½ pixel positions, the filter taps are applied to the integer pixels on either side of the ½ phase position for filtering. For example, during horizontal filtering to determine the pixel value 601 in the intermediate frame 507, the filter is effectively centered at ½ phase position 603 in row 1 between columns 1 and 2 of the QCIF frame 503. The four filter taps −5, 21, 21 and −5 (shown above the corresponding pixels) are applied to the consecutive integer pixels in row 1 at columns 0, 1, 2 and 3 of the QCIF frame 503. The value of each pixel is multiplied by the corresponding filter tap value and the results are added together and stored as pixel value 601 in the intermediate frame 507.

The integer pixel values of the intermediate frame 507 are again multiplied by 32 and stored as values of the pixels of the CIF frame 505. In a similar manner as with horizontal filtering, the ½ pixel positions are not shown, although filtering is applied in similar manner to the ½ pixel positions. For example, during vertical filtering to determine the value of a pixel 605 in the CIF frame 505, the filter is effectively centered at ½ phase position 607 in column 0 between rows 1 and 2 of the intermediate frame 507. The four filter taps −5, 21, 21 and −5 (shown above the corresponding pixel values) are applied to the consecutive integer pixel values in column 0 at rows 0, 1, 2 and 3 of the intermediate frame 507. Each pixel value is multiplied by the corresponding filter tap value and the results are added together and stored as the pixel 605 in the CIF frame 505. The values of each of the pixels of the CIF frame 505 are then divided by 32 in the horizontal and vertical directions in a similar manner as previously described.

In one embodiment, the Kaiser window function is used to derive the tap values of the filters 401, 501 and 601. The beta factor (β) is selected as 2.5, the number of side lobes (#SL) is selected as 1.5 and the down sampling ratio (DSR) is selected as 1.9 to achieve the down sampling filter tap values [−1, 17, 32, 17, −1]/64 of the 5-tap down sampling filter 401. For the up sampling filter design, β is 1.5, the #SL is 2 and the up sampling ratio (USR) is 2, resulting in a 7-tap filter with tap values [−5.44, 0, 20.71, 33.46, 0, 20.71, −5.44]/64.0. To normalize the scaling factor 33.46 to 32, an offset of 33.46 −32=1.46 is determined and redistributed to the remaining filter tap values to provide a new offset factor of 1.46/4=0.365. The normalized filter values for the up sampled case become [−5, 0, 21, 32, 21, 0, −5]/64 for the 7-tap case. The 7-tap filter may be implemented as a 4-tap filter [−5, 21, 21, −5]/32 for interpolation between two integer pixels with a scaling factor of 32 when applied to the integer pixels as described above with reference to FIG. 6 and description thereof. The resulting pixels are normalized by 32×32 as previously described. It is noted that any one or more of the beta factor, the number of side lobes, and the down sampling ratio may each be modified within a relatively small range while achieving substantially similar results (and thus may be approximate values). Nonetheless, the exact values listed above provide the particular filter tap coefficients described herein which provide improved filtering characteristics for dyadic spatial re-sampling applications.

The Kaiser window function referenced above is more specifically called the Kaiser-Bessel window function w(k), which is a function of the beta factor β and the filter tap order N according to the following equation (2):

$$w(k) = \frac{I_0\left[\beta\sqrt{1-(2k/(N-1))^2}\right]}{I_0[\beta]} \text{ for } -\frac{N-1}{2} \le k \le \frac{N-1}{2} \quad (2)$$

in which $I_0[x]$ is the modified zeroeth order Bessel function, expressed according to the following equation (3):

$$I_0[x] = 1 + \sum_{k=1}^{K}\left[\frac{(0.5x)^k}{k!}\right]^2 \quad (3)$$

where only a reduced number of terms (e.g., K=25 terms) in the summation of equation (3) need be calculated in most practical filter designs. The total number of filter taps N is determined by the multiplication of the number of side lobes and the re-sampling ratio (which is either the up sampling ratio for the up sampling filter or the down sampling ratio for the down sampling filter).

The resulting up and down re-sampling filters as described herein are very simple and easy to implement in image processing designs. The resulting up and down re-sampling filters may be used for video or image pre- and post-processing, and significantly increase coding efficiency for dyadic spatial scalability. The resulting up and down re-sampling filters outperform existing ESS filters when applied to dyadic spatial scalability.

A dyadic spatial re-sampling filter according to an embodiment of the present invention includes a down sampling filter and an up sampling filter. The down sampling filter is implemented according to a Kaiser window function having a beta factor of approximately 2.5, having approximately 1.5 side lobes, and having a down sampling ratio of approximately 1.9. The up sampling filter is implemented according to a Kaiser window function having a beta factor of approximately 1.5, having approximately 2 side lobes, and having an up sampling ratio of approximately 2.

The down sampling filter may be a 5-tap filter having tap values [−1, 17, 32, 17, −1]/64. The up sampling filter may include a 7-tap filter having tap values [−5.44, 0, 20.71, 33.46, 20.71, 0, −5.44]/64.0. Alternatively, the up sampling filter may include a 7-tap filter having tap values [−5, 0, 21, 32, 21, −5]/64. The up sampling filter may include a 4-tap filter having tap values [−5, 21, 21, −5]/32.

A dyadic spatial down sampling filter according to another embodiment of the present invention has tap values configured according to a Kaiser window function a beta factor of approximately 2.5, has approximately 1.5 side lobes, and has a down sampling ratio of approximately 1.9. The dyadic spatial down sampling filter may have tap values [−1, 17, 32, 17, −1]/64.

A dyadic spatial up sampling filter according to another embodiment of the present invention has tap values configured according to a Kaiser window function has a beta factor of approximately 1.5, has approximately 2 side lobes, and has an up sampling ratio of approximately 2. In one embodiment, the dyadic spatial up sampling filter may have tap values [−5.44, 0, 20.71, 33.46, 20.71, 0, −5.44]/64. In another embodiment, the filter has tap values [−5, 0, 21, 32, 21, 0, −5]/64. In yet another embodiment, the filter has tap values [−5, 21, 21, −5]/32.

A method of spatially re-sampling image information according to an embodiment of the present invention includes receiving first image information at a first resolution, and filtering the first image information through a dyadic up sampling filter and providing second image information at a second resolution. The dyadic up sampling filter is implemented according to a Kaiser window function having a beta factor of approximately 1.5, having approximately 2 side lobes, and having an up sampling ratio of approximately 2.

The method may include receiving third image information at the second resolution and filtering the third image information through a dyadic down sampling filter and providing fourth image information at the first resolution. In this case, the dyadic down sampling filter may be implemented according to a Kaiser window function having a beta factor of approximately 2.5, having approximately 1.5 side lobes, and having a down sampling ratio of approximately 1.9.

In an encoding embodiment, the method may include encoding the fourth image information to provide encoded image information at the first resolution, decoding the encoded image information to provide the first image information, and subtracting the second image information from the third image information to provide residual image information. The method may include encoding the residual information to provide encoded residual image information at the second resolution, and combining the encoded image information at the first resolution with the encoded residual image information at the second resolution into an output bitstream.

The method may include filtering the third image information through a dyadic 5-tap filter down sampling filter with coefficients [−1, 17, 32, 17, −1]/64. The method may include filtering the first image information through a dyadic 7-tap filter up sampling filter with coefficients [−5, 0, 21, 32, 21, 0, −5]/64. The method may include filtering the first image information through a dyadic 4-tap filter up sampling filter with coefficients [−5, 21, 21, −5]/32.

In a decoding embodiment, the method may include decoding first encoded image information to provide the first image information at the first resolution, decoding second encoded image information to provide residual image information at the second resolution, and adding the second image information to the residual image information to provide third image information at the second resolution.

Although the present invention has been described in considerable detail with reference to certain preferred versions thereof, other versions and variations are possible and contemplated. For example, circuits or logic blocks described herein may be implemented as discrete circuitry or integrated circuitry or software or any alternative configurations. Specific filter design values and coefficients do not need to be exact values and may slightly vary without significantly reducing filtering improvements. Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

The invention claimed is:

1. A dyadic spatial re-sampling filter, comprising:
   a down sampling filter for down sampling image information implemented according to a Kaiser window function having a beta factor of approximately 2.5, having approximately 1.5 side lobes, and having a down sampling ratio of approximately 1.9; and
   an up sampling filter implemented for up sampling image information according to a Kaiser window function having a beta factor of approximately 1.5, having approximately 2 side lobes, and having an up sampling ratio of approximately 2.

2. The dyadic spatial re-sampling filter of claim 1, wherein said down sampling filter comprises a 5-tap filter having tap values [−1, 17, 32, 17, −1]/64.

3. The dyadic spatial re-sampling filter of claim 1, wherein said up sampling filter comprises a 7-tap filter having tap values [−5.44, 0, 20.71, 33.46, 20.71, 0, −5.44]/64.0.

4. The dyadic spatial re-sampling filter of claim 1, wherein said up sampling filter comprises a 7-tap filter having tap values [−5, 0, 21, 32, 21, 0, −5]/64.

5. The dyadic spatial re-sampling filter of claim 1, wherein said up sampling filter comprises a 4-tap filter having tap values [−5, 21, 21, −5]/32.

6. A dyadic spatial down sampling filter for down sampling image information having tap values configured according to a Kaiser window function having a beta factor of approximately 2.5, having approximately 1.5 side lobes, and having a down sampling ratio of approximately 1.9.

7. The dyadic spatial down sampling filter of claim 6, wherein said filter comprises a 5-tap filter having tap values [−1, 17, 32, 17, −1]/64.

8. A dyadic spatial up sampling filter for up sampling image information having tap values configured according to a Kaiser window function having a beta factor of approximately 1.5, having approximately 2 side lobes, and having an up sampling ratio of approximately 2.

9. The dyadic spatial up sampling filter of claim 8, wherein said filter comprises a 7-tap filter having tap values [−5.44, 0, 20.71, 33.46, 20.71, 0, −5.44]/64.0.

10. The dyadic spatial up sampling filter of claim 8, wherein said filter comprises a 7-tap filter having tap values [−5, 0, 21, 32, 21, 0, −5]/64.

11. The dyadic spatial up sampling filter of claim 8, wherein said filter comprises a 4-tap filter having tap values [−5, 21, 21, −5]/32.

12. A method of spatially re-sampling image information, comprising:
    receiving first image information at a first resolution; and
    filtering the first image information through a dyadic up sampling filter and providing second image information at a second resolution, wherein the dyadic up sampling filter is implemented according to a Kaiser window function having a beta factor of approximately 1.5, having approximately 2 side lobes, and having an up sampling ratio of approximately 2.

13. The method of claim 12, further comprising:
    receiving third image information at the second resolution; and
    filtering the third image information through a dyadic down sampling filter and providing fourth image information at the first resolution, wherein the dyadic down sampling filter is implemented according to a Kaiser window function having a beta factor of approximately 2.5, having approximately 1.5 side lobes, and having a down sampling ratio of approximately 1.9.

14. The method of claim 13, wherein said filtering the third image information through a dyadic down sampling filter comprises filtering the third image information through a dyadic 5-tap filter down sampling filter with coefficients [−1, 17, 32, 17, −1]/64.

15. The method of claim 12, wherein said filtering the first image information through a dyadic up sampling filter comprises filtering the first image information through a dyadic 7-tap filter up sampling filter with coefficients [−5, 0, 21, 32, 21, 0, −5]/64.

16. The method of claim 12, wherein said filtering the first image information through a dyadic up sampling filter comprises filtering the first image information through a dyadic 4-tap filter up sampling filter with coefficients [−5, 21, 21, −5]/32.

* * * * *